United States Patent

[11] 3,624,531

| [72] | Inventors | Victor J. Norris, Jr.<br>Towson;<br>James B. Hovis, Ellicott City, both of Md. |
|---|---|---|
| [21] | Appl. No. | 855,601 |
| [22] | Filed | Sept. 5, 1969 |
| [45] | Patented | Nov. 30, 1971 |
| [73] | Assignee | Westinghouse Electric Corporation<br>Pittsburgh, Pa. |

[54] LASER RESONATOR ASSEMBLAGE
6 Claims, 6 Drawing Figs.

[52] U.S. Cl.................................................. 330/4.3,
332/7.51
[51] Int. Cl.................................................. H01s 3/02,
H01s 3/05
[50] Field of Search........................................... 331/94,
94.5, 155; 330/4, 4.3; 250/239, 105, 199; 332/7.51

[56] References Cited
UNITED STATES PATENTS
3,315,177 4/1967 Benson.......................... 331/94.5

| 3,327,243 | 6/1967 | Stickley........................ | 331/94.5 |
| 3,434,073 | 3/1969 | Forkner......................... | 331/94.5 |
| 3,464,026 | 7/1969 | Woodbury et al. ............ | 331/94.5 |

Primary Examiner—Rodney D. Bennett, Jr.
Assistant Examiner—N. Moskowitz
Attorneys—F. H. Henson, E. P. Klipfel and D. F. Straitiff ABSTRACT: Described is a laser resonator assemblage which includes two flat mirrors, one of which is the partial mirror and both of which are formed in the same plane surface on a common substrate joined to a first Porro prism disposed at one side with its hypotenuse face extending the length of the mirrors and disposed in the same plane. A second Porro prism, having its hypotenuse face equal in height and width to the first Porro prism and mirror unit, is arranged at right angles to such first Porro prism to form a rectangular three dimensional optical path between the mirrors.

LASER RESONATOR ASSEMBLAGE

BACKGROUND OF THE INVENTION

1. Field of the Invention

Laser resonators.

2. Description of the Prior Art

Two plane parallel mirrors forming a Fabry-Perot interferometer constitute the ideal laser resonator. Considering combinations of flat and spherical resonator mirrors, the plane parallel configuration provides the highest output energy and the lowest beam divergence. A further decrease in divergence is realized as the optical length of such a resonator is extended. However, the optical alignment requirements imposed by two flat parallel mirrors are prohibitive and difficult to maintain if the assembly is used in other than a laboratory environment. The severity of such requirements is compounded when the resonator length is increased. In the usual case the assembly is complex and must be fabricated to extremely close tolerances.

Present techniques that permit operation of the laser in a nonlaboratory environment obviate the alignment problem by employing mode selection techniques or hemispherical resonators. A low output beam divergence is achieved at the expense of a decrease in output energy and a susceptibility to becoming misaligned.

SUMMARY

The laser resonator assemblage of the present invention is particularly suited for nonlaboratory use by providing an assemblage which enjoys the advantage of a long optical length Fabry-Perot interferometer without the usual sensitivity to misalignment of optical elements involved. The two flat mirrors of the present invention are precluded from becoming misaligned with respect to each other by virtue of sharing the same substrate. The one Porro prism preferably also can share the same substrate as that on which the two mirror surfaces are formed to prevent misalignment between such prism and the two mirrors, while the second Porro prism arranged at right angles to the first Porro prism and equal in height to the span of the two coextensive mirrors, or mirror surfaces, in addition to quadrupling the optical length of the resonator, provides an arrangement which maintains the laser beam reflections confined to the optical system without walk-off between the two mirrors in the presence of relatively high degrees of misalignment between the two prisms, such as might occur as a result of rough handling of the equipment in field use, or transportation and handling of the device, or any other reason.

DESCRIPTION OF THE PREFERRED EMBODIMENT

Figure 1:
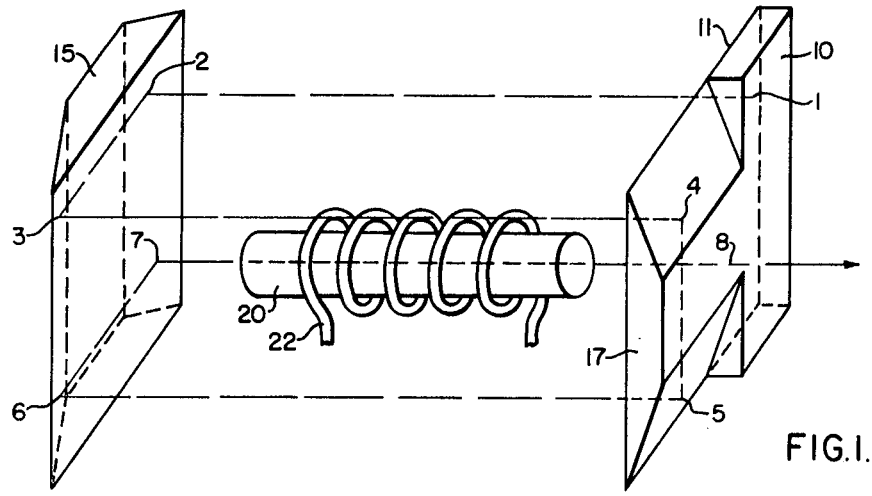
FIG. 1 is a three-dimensional schematic representation of a laser resonator system embodying the present invention.

Referring to FIG. 1 in the drawings, the laser resonator system of the present invention includes a planar reflector element 10 having an inner face 11 coated with reflective material to form an upper mirror and a lower partial mirror, both areas being located in a common plane. The reflector element 10 is formed of a transparent material such as crown glass to enable output of the laser beam through the partial mirror area. Longitudinally separated from the reflector element 10 there is a first Porro prism 15 of a height substantially equal to that of the reflector element and having its hypotenuse face arranged parallel to and facing the inner flat mirror face of the reflector element. Such first Porro prism is shown in frustrated form which in many instances may be preferred to reduce the overall length of the assemblage, and is arranged to deflect the beam along the horizontal. A second Porro prism 17, substantially the same height as the first Porro prism 15 and integrally attached to the reflector element 10 is disposed at one side thereof and arranged to deflect the laser beam traveling horizontally to and from the first Porro prism to two different vertical locations thereon. The second Porro prism 17 also is shown in a frustrated configuration in behalf of reducing the length of the overall assemblage as well as in facilitating fabrication of such second prism in conjunction with the integral flat reflector element 10.

In operation of the assembly, it functions effectively in the same manner as a Fabry-Perot resonator, with multiple reflection of the laser beam occurring between the two mirror areas on element 10 via a laser element 20, which may be in the form of a solid rod of laser material such as ruby, neodymium doped YAG, etc. for example, or in gaseous form, such as $CO_2$, etc. suitably disposed within a container, pumped by a light source 22, and disposed along one leg or segment of the optical path between the two mirrors, such as between points 7 and 8. The optical path for such multiple reflections can be traced in FIG. 1 as extending horizontally leftward from point 1 at the high reflectivity plane mirror area on the reflector element 10 to point 2 in the first Porro prism 15, then horizontally forward to point 3 in such first prism, thence horizontally rightward to point 4 in the second Porro prism 17, downward to point 5 in such second prism, leftward to point 6 in the first Porro prism, horizontally rearward to point 7 in such first Porro prism, and thence to point 8 at the lower partial mirror area of the reflector element 10; it being understood that a certain fraction of the light energy reaching such lower partial mirror area will be transmitted through the flat reflector element 10 in a direction normal to its outer flat face. The optical length of such a rectangular three dimensional path between points 1 and 8 of the two planar mirrors, which in the present case are arranged in the same plane, is greater than four times that of a conventional Fabry-Perot resonator with plane parallel mirrors aligned and facing one another at opposite ends of a straight line optical path.

With reference to FIG. 1, for example, it will be appreciated that the first Porro prism 15 is in effect two similar prisms stacked one on top of the other to deflect the beam horizontally at two different vertical locations. By fabricating two such prisms as a single unit as is exemplified, any misalignment problems which might be induced by the separate formation is eliminated. Similarly, the formation of two mirror surfaces on the same substrate element 10 eliminates potential misalignment problems between such mirrors, formation of the second Porro prism 17 on the same substrate as the reflector element 10 eliminates alignment problems of such prism relative to such mirror surfaces. In any event it will be appreciated that the optical surfaces of the several optical elements will be ground to precise tolerances, commensurate with requirements imposed by the laser light energy being handled by the system.

The characteristics of the resonator structure of the present invention are such that misalignment of the optical elements 10, 15 and 17, while affecting location of the several segments of the beam path relative to normal directions for such segments, nevertheless assures that multiple reflections between the two mirrors will occur repeatedly along the same beam path segment directions and will repeatedly reach the mirrors at the same locations without walk-off, as indicated schematically in FIGS. 2A, 2B, 2C and 2D, where different misalignment conditions of the optical elements are illustrated exaggeratedly together with the effect of such misalignment on the optical path between such elements. In the several figures the normal positions of the tilted elements are shown in dot-dash outline and both the normal and displaced beam path segments are shown and identified. For example in FIGS. 2A and 2C top views of beam path deflections corresponding to tilting of the first Porro prism 15 and element 10 about a vertical axis through their center are depicted respectively, and in FIGS. 2B and 2D side views of beam path deflections corresponding to tilting of the prisms 15 and 17 relative to a horizontal axis are depicted, respectively. It will be noted from these figures that the beam segments 1–2 and 7–8 reach the two mirror surfaces perpendicularly thereto regardless of the misalignment of the left-hand and right-hand optical members.

Figure 3:
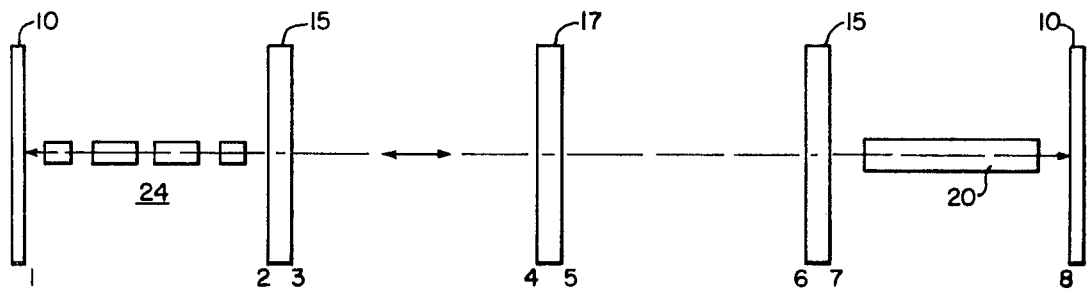
FIG. 3 is a schematic representation of an unfolded layout of the optical elements of the present invention and including a typical Q-switch assembly.
Figure 2A:
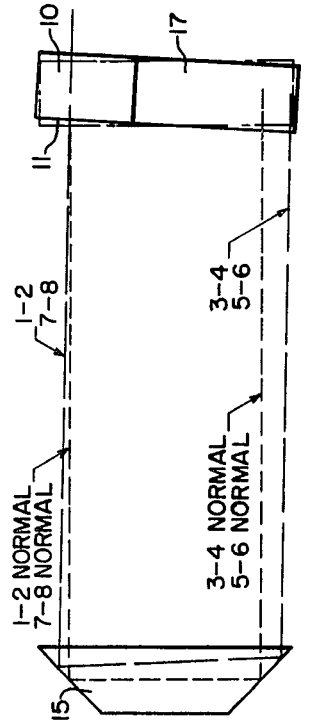
FIGS. 2A, 2B, 2C and 2D are top and side views of the resonator assemblage of the present invention illustrating exaggeratedly the effect of different types of misalignment of optical elements of such system on the path of the laser beam in the system.
Figure 2B:
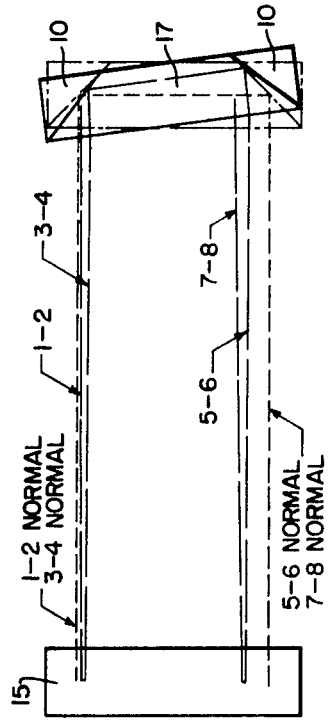
Figure 2C:
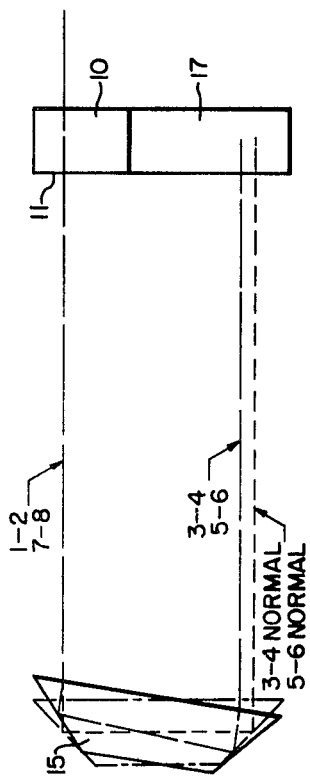
Figure 2D:
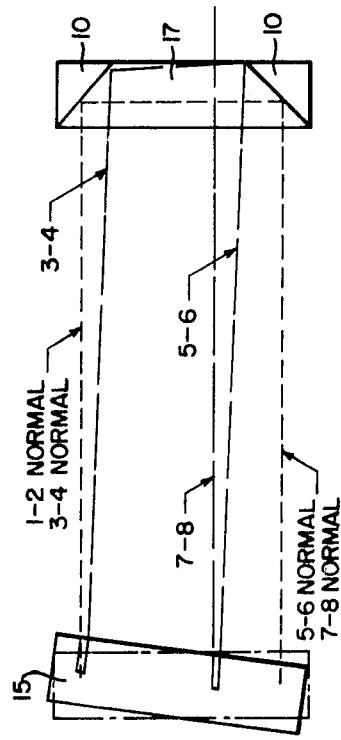

In addition, the resonator construction of the present invention is well suited to accommodate various types of light valves for purposes of modulation or on-off control of the output from the device. If such light valve is in the form of a mechanically rotated shutter or mirror, for example, it may be located in any point along the light path of the resonator. In the form of a Q-switch of the linear polarizing type, it also can be located anywhere along such path. In the case of a Q-switch assemblage 24 that involves use of such as electrooptical elements which effect circular polarization, as in Wentz U.S. Pat. No. 3,429,636, for example, such Q-switch must be located along the beam path segment between points 1 and 2 at the fully reflective mirror and the first prism means, as shown schematically in FIG. 3, presuming the laser rod 20 to be located in alignment with beam path segment between points 7 and 8 at the first prism means 15 and the partial mirror.

We claim:

1. A laser resonator assemblage, comprising,
a pair of planar mirror surfaces facing in the same direction, reflector means providing a rectangular three-dimensional multileg optical path between said mirror surfaces, and
a laser material disposed exclusively in one leg of said optical path for producing a laser beam therealong.

2. The laser resonator assemblage of claim 1, wherein,
said mirror surfaces are coplanar on a common substrate.

3. The laser resonator assemblage of claim 2, wherein,
said reflector means is in the form of three Porro prisms, two prisms of which face the planar mirror surfaces respectively at a spaced-apart location for retroversion of the optical path at locations offset from alignment with such mirror surfaces, and one prism of which faces such two prisms for retroversion of the light path therebetween.

4. The laser resonator assemblage of claim 3, wherein,
said two prisms constitute regions of a single prism member, and said one prism is formed as an integral part of the substrate for the two mirror surfaces.

5. The laser resonator assemblage of claim 1, wherein,
one of said planar mirror surfaces is partially transmissive to the light energy generated by said laser material to serve as the light outlet for the assemblage.

6. The laser resonator assemblage of claim 1, wherein,
a light-modulating means is included in the aforesaid optical path.

* * * * *